US007042471B2

(12) United States Patent
Glass et al.

(10) Patent No.: US 7,042,471 B2
(45) Date of Patent: May 9, 2006

(54) METHOD AND SYSTEM FOR DISPLAYING DESCRIPTIVE INFORMATION ASSOCIATED WITH A DEFINED VIDEO OBJECT

(75) Inventors: David W. Glass, Georgetown, KY (US); James G. McLean, Guquay-Varina, NC (US); Daniel J. Winarski, Tucson, AZ (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 10/201,407

(22) Filed: Jul. 22, 2002

(65) Prior Publication Data

US 2004/0012619 A1 Jan. 22, 2004

(51) Int. Cl.
*G09G 5/00* (2006.01)
*G06F 15/00* (2006.01)
*H04N 11/00* (2006.01)
*H04N 9/74* (2006.01)
*H04N 9/76* (2006.01)

(52) U.S. Cl. .................. 345/636; 345/629; 715/500.1; 715/501.1; 715/708; 715/711; 348/460; 348/461; 348/552; 348/589; 348/600

(58) Field of Classification Search ................ 345/581, 345/473, 636, 629; 715/500.1, 501.1, 711, 715/708, 716, 719, 500; 386/69; 725/142; 348/460, 461, 468, 552, 563, 564, 589, 600

See application file for complete search history.

(56) References Cited

U.S. PATENT DOCUMENTS

| 5,541,662 A | * | 7/1996 | Adams et al. ............... 348/460 |
| 5,576,946 A | | 11/1996 | Bender et al. |
| 5,708,845 A | * | 1/1998 | Wistendahl et al. ..... 715/500.1 |
| 5,828,371 A | | 10/1998 | Cline et al. |

(Continued)

FOREIGN PATENT DOCUMENTS

JP          11-313287 A      11/1999

(Continued)

OTHER PUBLICATIONS

Akihito, A., et al. "VIDEOSTYLER: Video Interface for Spatiotemporal Interactions Based on Multi-dimensional Video Computing", *Trans. of Info. Proc. Soc. of Japan*, vol. 39, No. 5, pp. 1307-1316.

(Continued)

*Primary Examiner*—Amr A. Awad
*Assistant Examiner*—Chante Harrison
(74) *Attorney, Agent, or Firm*—Scully, Scott, Murphy & Presser, P.C.; Robert Sullivan, Esq.

(57) ABSTRACT

According to the present invention, there is provided a method, system and program storage device for displaying textual information associated with a defined video object in video data on a video display device, comprising: sampling a video object plane to determine whether the video object is in the video object plane for displaying the video object on the video display device; updating a location of the video object in the video object plane as the video object moves during display of the video data on the video display device; determining whether a pointing device is over the updated location of the video object; and displaying the textual information associated with the video object on the video display device for a predetermined period of time.

19 Claims, 9 Drawing Sheets

U.S. PATENT DOCUMENTS

| | | | |
|---|---|---|---|
| 5,854,893 A | 12/1998 | Ludwig et al. | |
| 5,987,454 A | 11/1999 | Hobbs | |
| 6,047,317 A * | 4/2000 | Bisdikian et al. | 725/142 |
| 6,081,278 A * | 6/2000 | Chen | 345/473 |
| 6,088,030 A | 7/2000 | Bertram et al. | |
| 6,154,771 A * | 11/2000 | Rangan et al. | 345/661 |
| 6,175,840 B1 * | 1/2001 | Chen et al. | 715/501.1 |
| 6,198,833 B1 | 3/2001 | Rangan et al. | |
| 6,208,344 B1 | 3/2001 | Holzman et al. | |
| 6,462,754 B1 * | 10/2002 | Chakraborty et al. | 715/723 |
| 2002/0122042 A1 * | 9/2002 | Bates et al. | 345/581 |
| 2003/0223732 A1 * | 12/2003 | Lin et al. | 386/69 |
| 2004/0221225 A1 * | 11/2004 | Hyman et al. | 715/500.1 |
| 2005/0193322 A1 * | 9/2005 | Lamkin et al. | 715/500.1 |

FOREIGN PATENT DOCUMENTS

JP          11-313296 A      11/1999

OTHER PUBLICATIONS

Messer K., et al., "Using feature selection to aid an iconic search through an image database", *IEEE Int. Conf. on Acoustics, Speech, and Signal Processing*, Munich, Germany, Apr. 21-24, 1997, vol. 4, pp. 1141-1146.

"Image Selection from Within a Presentation Manager Application", *IBM Technical Disclosure Bulletin*, vol. 36, No. 09B, Sep. 1993; pp. 195-196.

\* cited by examiner

FIG. 8

MPEG-4 VIDEO OBJECT TYPE INDICATIONS

| VIDEO_OBJECT_TYPE | CODE |
|---|---|
| RESERVED | 00000000 |
| SIMPLE OBJECT TYPE | 00000001 |
| SIMPLE SCALABLE OBJECT TYPE | 00000010 |
| CORE OBJECT TYPE | 00000011 |
| MAIN OBJECT TYPE | 00000100 |
| N-BIT OBJECT TYPE | 00000101 |
| BASIC ANIMATION 2D TEXTURE | 00000110 |
| ANIMATION 2D MESH | 00000111 |
| SIMPLE FACE | 00001000 |
| STILL SCALABLE TEXTURE | 00001001 |
| RESERVED | 00001010-11111111 |

FIG. 9

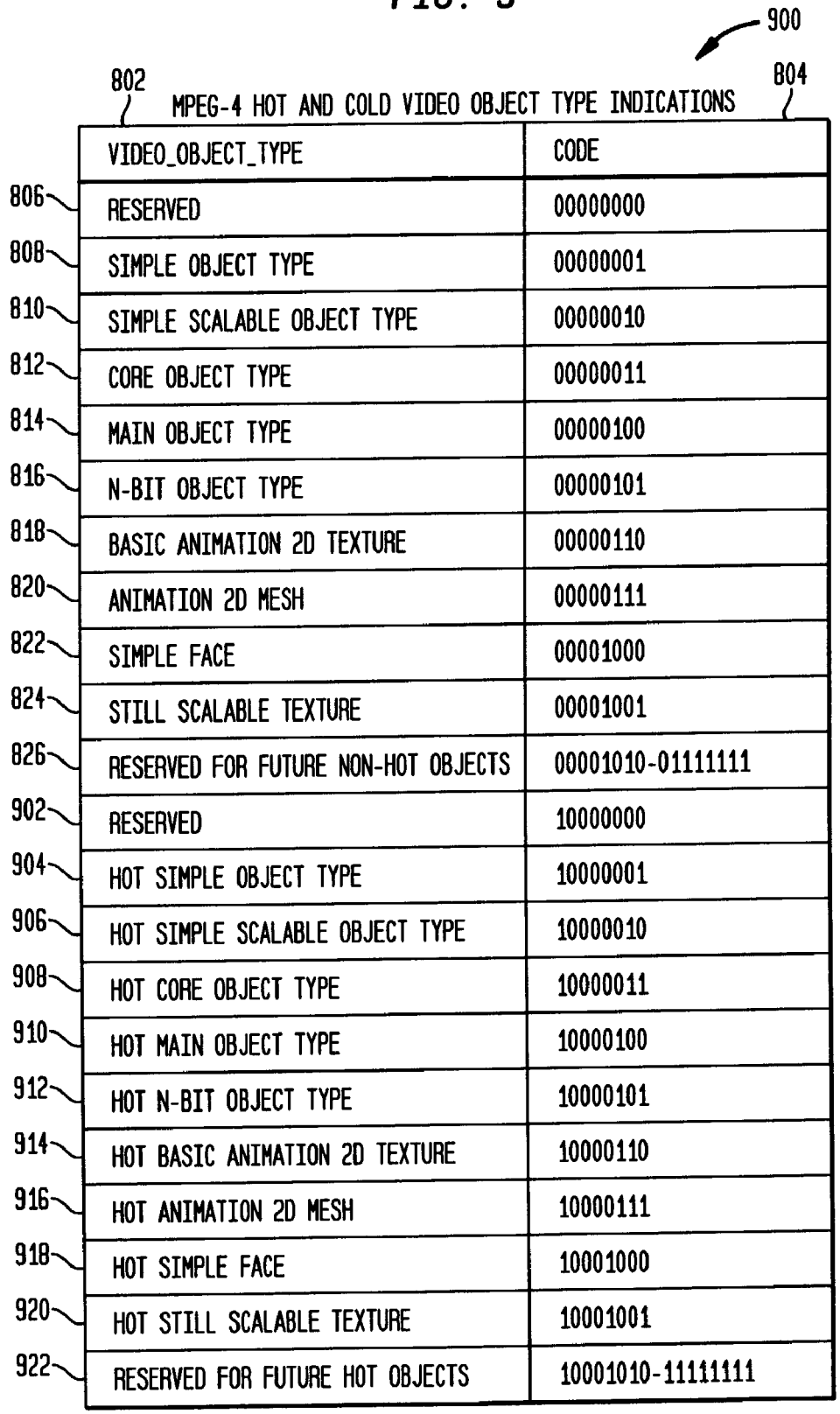

MPEG-4 HOT AND COLD VIDEO OBJECT TYPE INDICATIONS

| VIDEO_OBJECT_TYPE | CODE |
|---|---|
| RESERVED | 00000000 |
| SIMPLE OBJECT TYPE | 00000001 |
| SIMPLE SCALABLE OBJECT TYPE | 00000010 |
| CORE OBJECT TYPE | 00000011 |
| MAIN OBJECT TYPE | 00000100 |
| N-BIT OBJECT TYPE | 00000101 |
| BASIC ANIMATION 2D TEXTURE | 00000110 |
| ANIMATION 2D MESH | 00000111 |
| SIMPLE FACE | 00001000 |
| STILL SCALABLE TEXTURE | 00001001 |
| RESERVED FOR FUTURE NON-HOT OBJECTS | 00001010-01111111 |
| RESERVED | 10000000 |
| HOT SIMPLE OBJECT TYPE | 10000001 |
| HOT SIMPLE SCALABLE OBJECT TYPE | 10000010 |
| HOT CORE OBJECT TYPE | 10000011 |
| HOT MAIN OBJECT TYPE | 10000100 |
| HOT N-BIT OBJECT TYPE | 10000101 |
| HOT BASIC ANIMATION 2D TEXTURE | 10000110 |
| HOT ANIMATION 2D MESH | 10000111 |
| HOT SIMPLE FACE | 10001000 |
| HOT STILL SCALABLE TEXTURE | 10001001 |
| RESERVED FOR FUTURE HOT OBJECTS | 10001010-11111111 |

METHOD AND SYSTEM FOR DISPLAYING DESCRIPTIVE INFORMATION ASSOCIATED WITH A DEFINED VIDEO OBJECT

BACKGROUND OF THE INVENTION

1. Technical Field of the Invention

The present invention generally relates to a video display system. More particularly, the present invention is directed to a method and system for displaying viewer-selected descriptive information associated with a "hot" video object and embedded in video data on the video display system.

2. Description of the Prior Art

In a digital world where information technology, consumer electronics and telecommunication products incorporate increasingly sophisticated technologies, Moving Picture Experts Group (i.e., MPEG) technology provides a proven mechanism to promote industry innovation. MPEG, a working group of International Organization for Standardization/International Electronics Commission (i.e., "ISO/IEC"), develops the international standards for compression, decompression, processing, and coded representation of moving pictures, audio and their combination. One of the latest standard developed by MPEG is the MPEG-4 standard—formally designated by the ISO/IEC as ISO/IEC 14496—which provides an object-based framework for video representation that is well suited for encoding separate visual objects and associated audio objects into MPEG-4 video data for display on a video display system. The MPEG-4 as an accepted and widely used standard among application developers, service providers, content creators and end-users alike.

The MPEG-4 standard (i.e., ISO/IEC 14496) is an enabling technology that facilitates access to the visual objects for both natural (recorded via a video camera) video data and synthetic video data (generated via computer), and associated natural and synthetic sounds for various applications such as digital storage media, the Internet, various forms of wired or wireless communications, and the like. MPEG-4 enables the developers, the service providers, the content creators and the end-users to manipulate the video data as a form of computer data and to store the video data on various storage media, transmit and receive the video data over existing and future networks, and distribute video data over existing and future broadcast channels. The applications of MPEG-4 standard cover, but are not limited to, Internet multimedia; interactive video games; interpersonal communications such as video-conferencing, video-phone, and the like; interactive storage media such as optical disks; multimedia mailing; networked database services; remote emergency systems; remote video surveillance; wireless multimedia; and multimedia.

Notwithstanding the fact the MPEG-4 is an enabling technology, there is a need in the art for providing a system and method for handling the display of descriptive information associated with a defined "hot" video objects embedded in video data on a video display device.

SUMMARY OF THE INVENTION

It is therefore an object of the present invention to provide a system and method for identifying "hot" video objects encoded in video data that are to be displayed on a video display device according to the present invention.

It is another object of the present invention to provide a system and method for displaying user-defined descriptive information associated with an identified "hot" video object embedded in video data on the video display device.

It is a further object of the present invention to provide a system and method for displaying the user-defined descriptive information associated with the identified "hot" video object embedded in video data on the video display device upon user selection of "hot" video object.

According to an embodiment of the present invention, there is provided a method for displaying textual information associated with a defined hot video object in video data on a video display device, the method comprising: sampling a video object plane to determine whether the hot video object is in the video object plane for displaying the hot video object on the video display device; updating a location of the hot video object in the video object plane as the video object moves during display of the video data on the video display device; determining whether a pointing device is over the updated location of the video object; and displaying the textual information associated with the hot video object on the video display device for a predetermined period of time.

According to another embodiment of the present invention, there is provided a system for displaying textual information associated with a defined hot video object in video data, the system comprising: a decoder for sampling a video object plane to determine whether the hot video object is in the video object plane for displaying the hot video object and for updating a location of the hot video object in the video object plane as the video object moves during display of the video data; a processor for determining whether a pointing device is over the updated location of the video object; and a video display device for displaying the textual information associated with the hot video object on the video display device for a predetermined period of time.

According to yet another embodiment of the present invention, there is provided a program storage device, tangibly embodying a program of instructions executable by a machine to perform a method for displaying textual information associated with a defined hot video object in video data on a video display device, the method comprising: sampling a video object plane to determine whether the hot video object is in the video object plane for displaying the hot video object on the video display device; updating a location of the hot video object in the video object plane as the video object moves during display of the video data on the video display device; determining whether a pointing device is over the updated location of the video object; and displaying the textual information associated with the hot video object on the video display device for a predetermined period of time.

BRIEF DESCRIPTION OF THE DRAWINGS

The objects, features and advantages of the present invention will become apparent to one skilled in the art, in view of the following detailed description taken in combination with the attached drawings, in which:

FIG. 8 illustrates the MPEG-4 video object type indications for non-hot (or cold) video objects in MPEG-4 video data according to the ISO/IEC 14496 standard; and FIG. 9 illustrates exemplary MPEG-4 video object type indications for "hot" video objects in MPEG-4 video data in accordance with the ISO/IEC 14496, according to the present invention.

DETAILED DESCRIPTION OF THE PREFERRED EMBODIMENT OF THE INVENTION

The present invention is directed to a system and method for displaying viewer-selected descriptive information associated with a defined "hot" video object and embedded in video data on the video display system.

Figure 1:
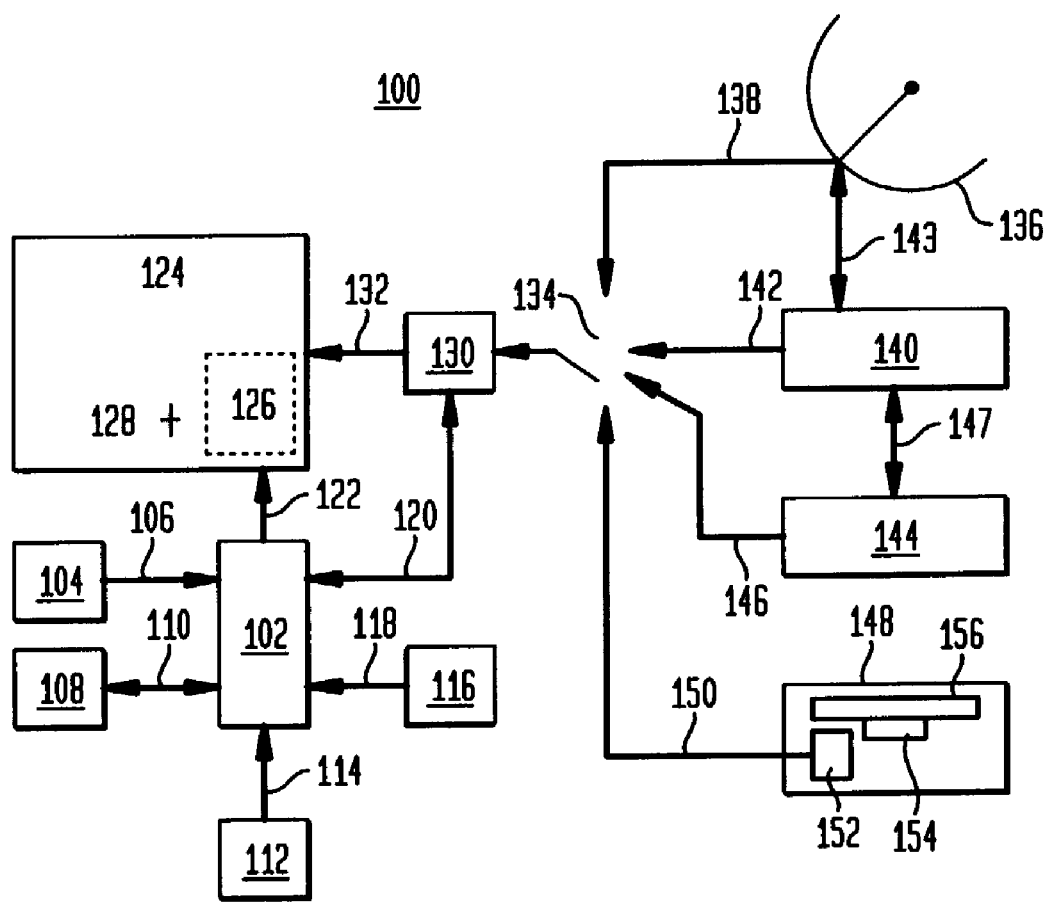
FIG. 1 is an exemplary block diagram of an entertainment system according to the present invention.

FIG. 1 is an exemplary block diagram of an entertainment system 100 according to the present invention. The entertainment system 100 is preferably a personal computer. Alternatively, the entertainment system 100 may be a laptop computer, or a portable digital versatile disk (i.e., "DVD") player, which includes a video display device. The entertainment system 100 comprises the following components for receiving video data (i.e., MPEG-4 video data) according to the present invention. More particularly, the entertainment system 100 comprises a disk player 148, which is preferably a DVD player, or alternatively a personal video recorder (i.e., "PVR"). In the preferred case in which the disk player 148 is a DVD player, the disk player 148 has a motor 154, which turns disk 156 and a video data (i.e., MPEG-4 video data) is read from disk 156 by reader 152 for transmission via link 150 to an Application Specific Integrated Circuit (i.e., "ASIC") decoder 130 or for simplicity decoder 130. In the DVD player, the disk 156 is a DVD disk and reader 152 comprises a laser, focus lens and photodetector. Alternatively, if the disk player 148 is a PVR, then disk 156 is a magnetic disk and reader 152 is a magnetic detector. The entertainment system 100 may further comprise a set top box (i.e. "STB") 144 for receiving signals (i.e., MPEG-4 video data) from a cable system head end (not shown) for transmission via link 146 to the decoder 130, or a satellite system 136 for receiving signals (i.e., MPEG-4 video data) from orbiting satellites or land-based retransmission towers for transmission via link 138 to the decoder 130. Additionally, the entertainment system 100 may still further comprise modem 140 for receiving video data over the Internet (not shown) for transmission via link 142 to the decoder 130. The modem 140 is preferably a wireless modem. It is noted, however, that the modem 140 may utilize a standard public switched telephone network (i.e., "PSTN") connection (not shown), a digital subscriber line (i.e., "DSL") connection (not shown), a cable connection 147 via STB 144 or a satellite connection 143 via satellite system 136. Furthermore, the entertainment system 100 comprises a user-selectable switch 134 for selectively choosing whether video data will be input from disk player 146, STB 144, modem 140 or satellite system 136. The user-selectable switch 134 is preferably a software component, which is executed via microprocessor 102 (described herein below), or alternatively the switch 134 may be a hardware component switched by a user. It is noted that video data links 138, 142, 146 and 150 all transmit identically formatted video data (i.e., MPEG-4 video data) through the switch 140 to decoder 130.

Further with reference to FIG. 1, although the decoder 130 will be described in greater detail in FIG. 3 below, at this point it is important to note that the decoder 130 is a critical component of the entertainment system 100, which receives and decodes video data (i.e., MPEG-4 video data) from any of the foregoing video data inputs (described in detail herein below in FIG. 3) to create video images comprising "hot" video objects 126 and associated user-defined descriptive information and transmits the video images to a video display device 124 for display. It is further important to note that the decoder 130, which is in bidirectional communication over link 120 with microprocessor 102, transmits to the microprocessor 102 information regarding the location of "hot" video objects 126 and the associated user-defined descriptive information, if any, for that "hot" video object 126. Mode particularly, the "hot" video objects 126 are defined by information encoded in the video data received at the decoder 130 for decoding and subsequent display on the video display device 124. The information defining the "hot" video objects 126 may be interleaved with, appended to or concatenated with the video data thus received. The decoder 130 decodes the video data, separating the information that defines the "hot" video object 126 as well as the associated user-defined descriptive information from the video data. The microprocessor 102 receives location information from the decoder 130 with regard to the "hot" video object 126 and compares that location to location of a cursor 128 (See FIGS. 5–7 below). Although the decoder 130 is preferably a separate hardware component (i.e., ASIC) of the entertainment system 100, one skilled in the art will readily appreciate that the decoder 130 may easily be implemented as a software component, i.e., a set of microcode instructions that are executed completely within the microprocessor 102.

Figure 5:
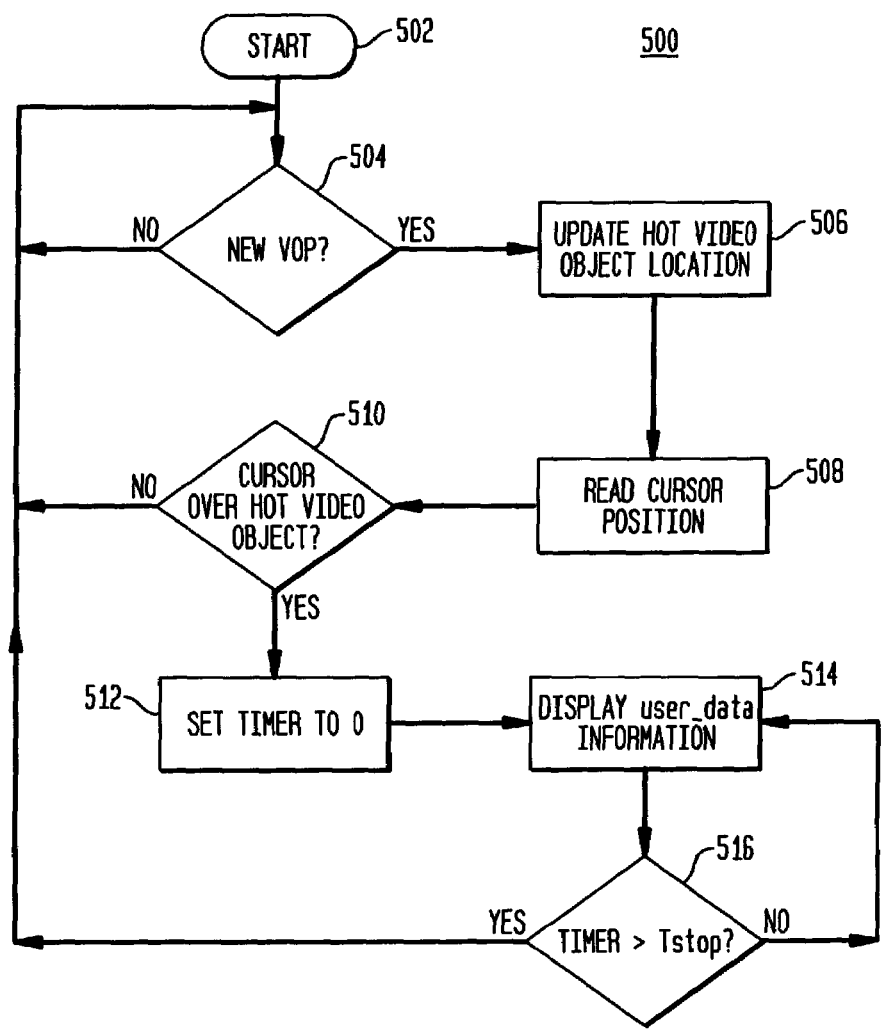
FIG. 5 is an exemplary method flowchart depicting a preferred method for displaying the descriptive information associated with a "hot" video object on a video display device according to the present invention.
Figure 6:
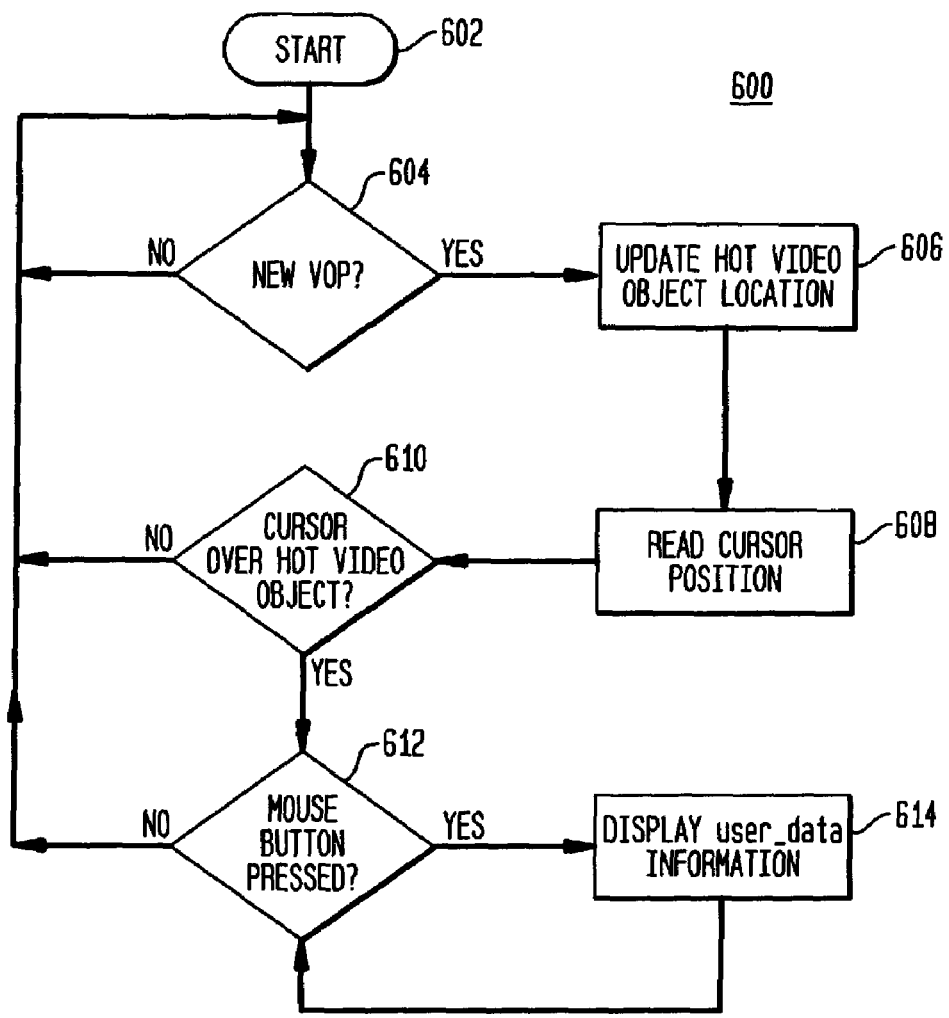
FIG. 6 is an exemplary method flowchart depicting an alternate method for displaying the user-defined descriptive information associated with a "hot" video object on a video display device according to the present invention.
Figure 7:
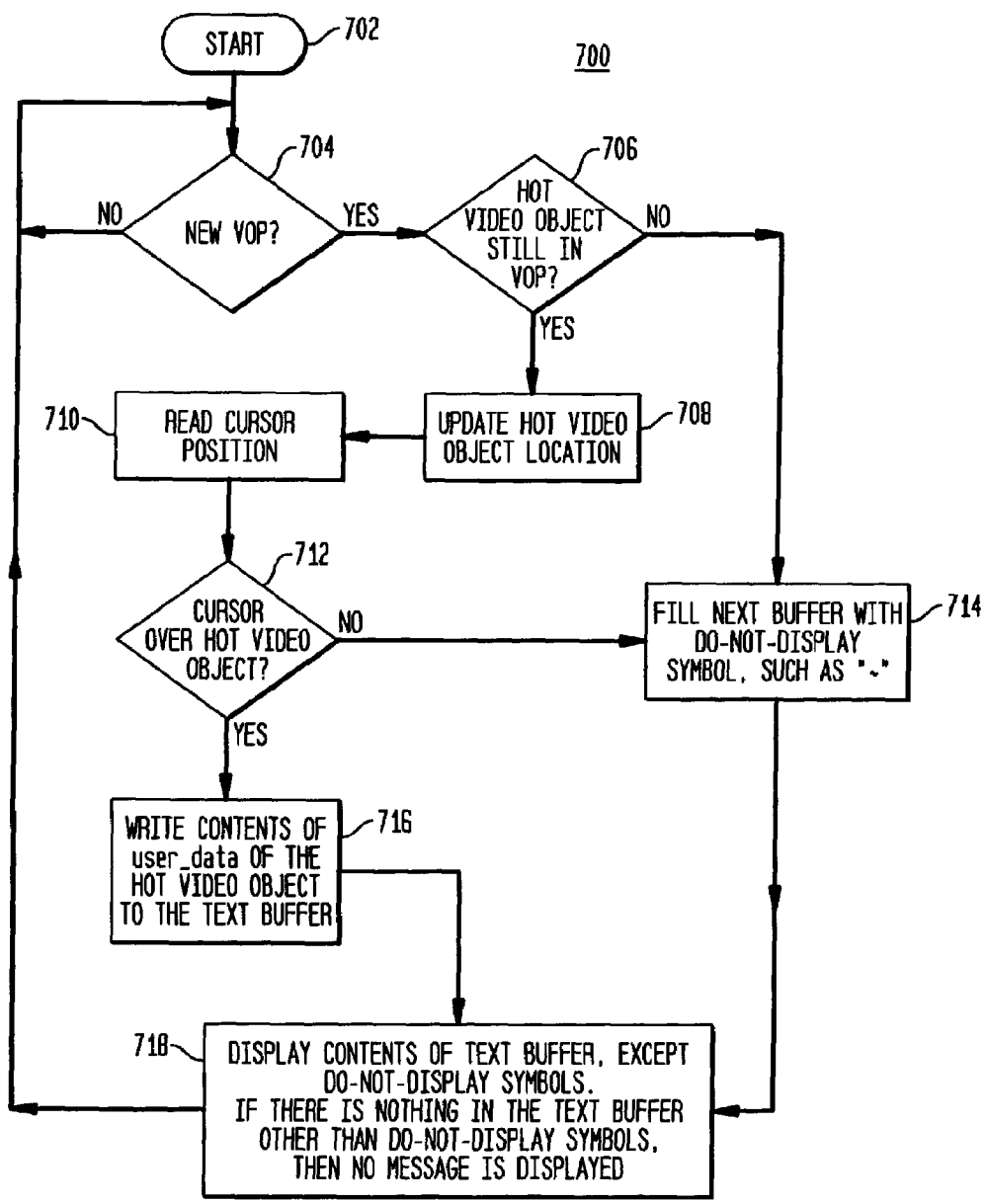
FIG. 7 is an exemplary method flowchart that accounts for not displaying the user-defined descriptive information associated with a "hot" video object on a video display device when the "hot" video object is no longer in the video data according to the present invention.

Yet further with reference to FIG. 1, the microprocessor 102 is coupled to read only memory (i.e., "ROM") 104 via link 106 for storing microcode instructions for executing method flowcharts of FIGS. 5–7 below, and further coupled to random access memory (i.e., "RAM") 108 via link 110 for storing user-defined descriptive information according to the present invention. More particularly, microprocessor 102 receives the location for the "hot" video object 126 and user-defined descriptive information for "hot" video object 126 and stores this information in the RAM 108. The microcode for flowcharts illustrated in FIGS. 5–7 is stored in ROM 104. The microprocessor 102 utilizes the RAM 108 to temporarily store and retrieve data associated with the entertainment system 100, such as the user-defined descriptive information. The microprocessor 102 is still further coupled to input device 112 for receiving user input according to the present invention. More particularly, the "hot" video objects 126 displayed on the video display device 124 are selected by a user via cursor 128, which the user controls via the input device 112. The microprocessor 102 indicates the location of cursor 128 on video display device 124 via link 122. The input device 112 is preferably a wireless mouse, or alternatively, a track point, trackball or any other input device capable of selecting the "hot" video objects 126 according to the present invention. If the input device 112 is not wireless, it communicates via link 114 with the microprocessor 102. Yet further, the microprocessor 102 is coupled to a crystal oscillator 116 via link 118, which provides the microprocessor 102 with the ability to tell time. The oscillator 116 may be a 10 MHz crystal, which creates 100 ns time periods. It is noted that instead of the oscillator 116, the microprocessor may provide its own internal clock. An oscillator that is a 30 MHz crystal or a 25 MHz crystal is preferred to synchronize the timing for displaying user-defined descriptive information with a frame rate of the video data of respectively 30 Hz for NTSC and 25 Hz for PAL.

Still further with reference to FIG. 1, the video display device 124 of the entertainment system 100 is preferably a liquid crystal display (i.e., "LCD"). Alternately, the video display 124 may be a cathode ray tube (i.e., "CRT"), a light emitting diode (i.e., "LED") or an electro-luminescent display. Moreover, the video display 124 may be an LCD-based or a CRT-based projection system. The microprocessor 102 receives from decoder 130 the location of "hot" video objects and associated user-defined descriptive information for display on the video display device 124. Once the cursor 128 is over the "hot" video object and a selection of the "hot" video object is made per FIGS. 5–7, the microprocessor 102 directs the decoder 130 to display the user-defined descriptive information associated with the "hot" video object 126.

Finally with regard to FIG. 1, in operation the decoder 130 of the entertainment system 100 decodes video data received from an input source 136, 140, 144 or 148 and forwards location information for "hot" video objects and associated user-defined descriptive information to the microprocessor 102. In parallel with transmission of the location information and associated user-defined descriptive information, video images that comprise hot video objects 126 decoded from video data are transmitted via link 132 from the decoder 130 to the video display device 124 for display. Thereafter, when a user points to a particular "hot" video object 126 displayed on video display device 124 via cursor 128, the microprocessor 102 compares the location of cursor 128 on the video display device 124 and the location of the "hot" video object. It is noted that the decoder 130 constantly updates the location information for the "hot" video object at the microprocessor 102, particularly as the hot video object location may move in the video data as it is decoded over time. Therefore, if it determined by this comparison that the user is pointing at a "hot" video object 126, the microprocessor 102 notifies decoder 130 to merge the decoded video images with the associated user-defined descriptive information stored in the RAM 108. Notwithstanding the RAM 108, the decoder may provide its own data store for storing user-defined descriptive information, and upon notification by the microprocessor to merge the descriptive information with the video images to be displayed. The video images transmitted by the decoder 130 via link 132 to video display device 124 now comprise associated user-defined descriptive information, which is displayed on the video display device 124 as particularly described below with reference to FIG. 4. Typically the user-defined descriptive information is displayed at the bottom portion of the video display device. Otherwise, the video images are not merged with the associated user-defined descriptive information and therefore the descriptive information is not displayed on the video display device 124.

Figure 2:
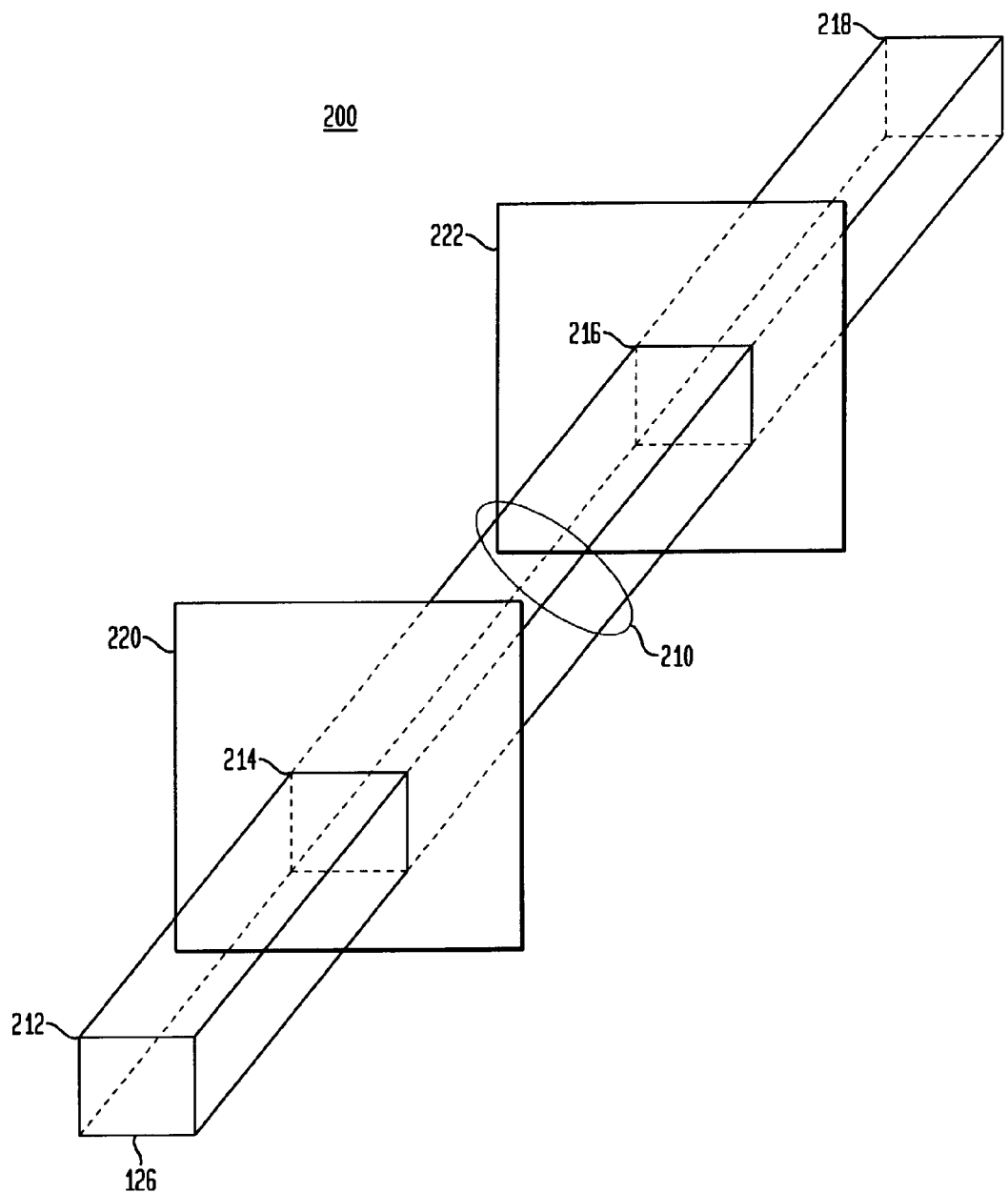
FIG. 2 is an exemplary block diagram depicting sampling of a video object at a video object plane according to the present invention.

FIG. 2 is an exemplary block diagram 200 depicting the sampling of a "hot" video object of FIG. 1 at a video object plane (i.e., "VOP") in the decoder 130 according to the present invention. A VOP reconstruction block 324 of the decoder 130 preferably controls the sampling. According to FIG. 2, there is depicted a "hot" video object 126 at disparate time positions 212, 214, 216 and 218 during a time continuum 210. The "hot" video object 126 effectively exists through the time continuum 210, but is sampled for display on the video display device 124 of FIG. 1 at video object planes (i.e., "VOP") 220 and 222 at respective time positions 214 and 216 of the time continuum 210. The decoder comprises an oscillator or timer for providing 30 MHz for NTSC time intervals or 25 MHz for PAL and may easily implement the oscillator associated with the microprocessor 102. Other frequencies can be provided depending on the decoder implementation desired. The "hot" video object 126 at a later-in-time position 216 sampled at VOP 222 may not be in the same display position on the video display device 124 as the "hot" video object 126 at an earlier-in-time position 214 sampled at VOP 220. It is noted, however, that the location of the "hot" video object 126 is known to the decoder 130 at each VOP 220 and 222 via motion vectors and this location and the associated user-defined descriptive information are thus transmitted to the microprocessor 102 to update the values for the "hot" video object 126. Because of the conflicting requirements of random access to and highly efficient compression, three main VOP types are defined. A first VOP type is an intra coded VOP (i.e., "I-VOP"), which is coded without reference to other pictures. The I-VOP provides access points to a coded sequence where decoding can begin, but is coded with only moderate compression. A second VOP type is a predictive coded VOP (i.e., "P-VOP"), which is coded more efficiently using motion compensated prediction from a past I-VOP or P-VOP and is generally used as a reference for further prediction. The third VOP type is a bidirectionally-predictive coded VOP (i.e., "B-VOP"), which provides a highest degree of compression but requires both past and future reference VOPs for motion compensation. The B-VOP is never used as references for prediction, except in a case that a resulting VOP is used as a reference for a scalable enhancement layer. The organization of the three VOP types (i.e., I-VOP, P-VOP and B-VOP) in a sequence is very flexible.

Figure 3:
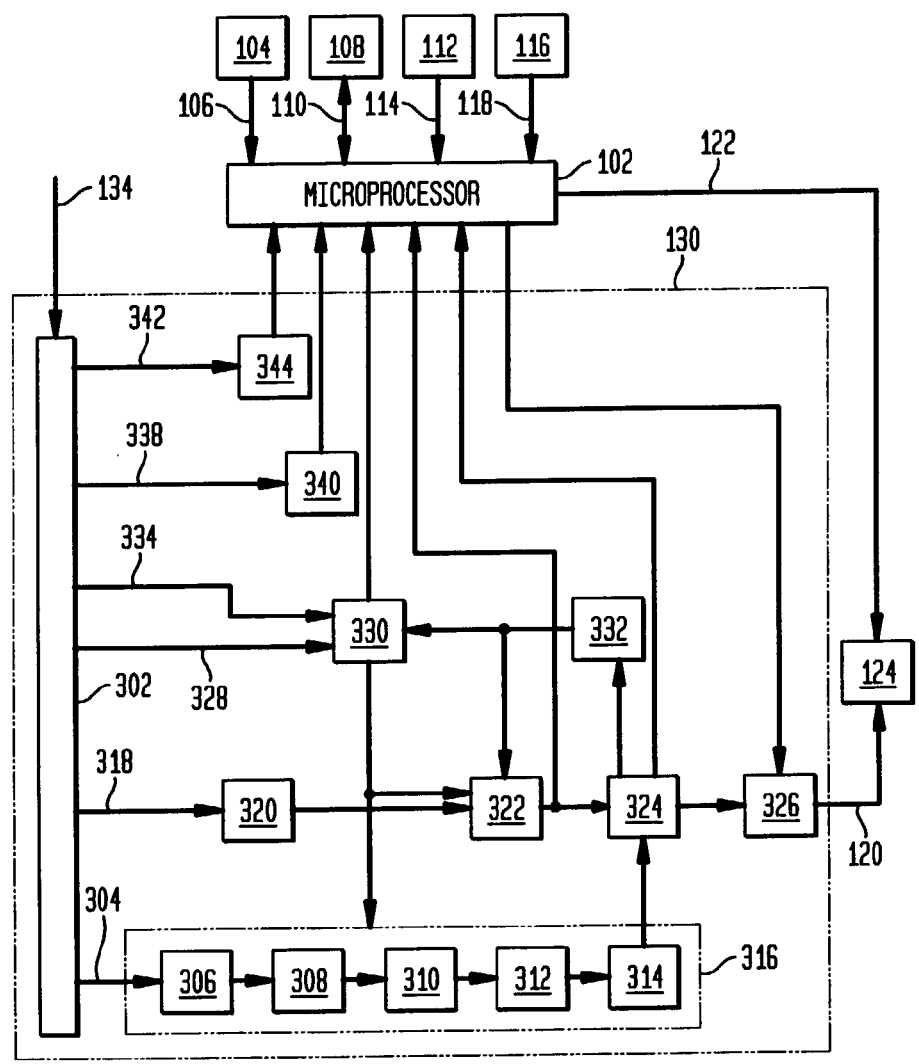
FIG. 3 is an exemplary decoder that recognizes and decodes "hot" video objects within video data according to the present invention.

FIG. 3 is an exemplary decoder 300 that recognizes "hot" video objects within video data according to the present invention. The specification of "hot" video objects is described in greater detailed below in FIGS. 8 and 9. As aforementioned, the encoding process does not form a part of the present invention and thus no changes are needed to the hardware of the video encoder. Thus, the following description of decoder 130 of FIG. 3 is part of the known MPEG-4 decoding and therefore is only briefly described. According to the known part of MPEG-4 decoder 130, demultiplexer 302 receives via switch 134 MPEG-4 video data from the foregoing sources (e.g., satellite system 136, modem 140, STB 144 and disk player 148) that comprises "hot" video objects according to the present invention. The demultiplexer 302 feeds the texture-encoded part of the video data via link 304 to texture decoding component 316. The texture-decoding component 316 is comprised of known variable length decoding 306, inverse scan 308, inverse DC and AC prediction 310, inverse quantization 312 and inverse discrete cosine transform (i.e., "IDCT") 314.

The demultiplexer 302 farther feeds motion-encoded data of the video data via link 318 to motion decoder 320, which transmits its output to motion compensator 322, which uses motion vectors to determine change of positions of video objects. Yet farther, the demultiplexer 302 feeds shape-encoded data of the video data via link 328 and video_object_layer_shape via link 334 to shape-decoding 330. The shape-encoded data and the video_object_layer_shape and previously reconstructed VOPs 332 are utilized together for shape decoding at shape-decoding 330 for decoding the shape of the video object. Furthermore, the previously reconstructed VOPs 332 and the output of shape decoding 330 are input to motion compensator 322. The output of motion compensator 322 as well as the output of texture decoding 316 are utilized in VOP reconstruction block 324. The output of VOP reconstruction block 324 is transmitted to the previously reconstructed VOP 332, as well as to video merger 326, which takes the display stream from VOP reconstruction block 324 and merges the user-defined descriptive information with the stream for display on video display device 124.

Further with regard to FIG. 3, the afore-described components 302, 304, all subcomponents of 316, 320, 322, 324, 330 and 332 of the decoder 130 of FIG. 3 are well known in the art. According to the present invention, the decoder 130 includes new components 326, 340 and 344, which operate in combination with the well-known components of the decoder 130 described above to facilitate "hot" video objects according to the present invention. Notwithstanding the fact that user_data 340 already exists in the MPEG-4 definition, this is the first time that the decoder 130 accesses the user_data 340 via link 338 according to the present invention for displaying the user-defined descriptive information associated with defined "hot" video objects in the MPEG-4 video data. Moreover, this is the first time that the decoder 130 accesses the video_object_type 344 via link 342 for displaying the "hot" video objects according to the present invention, as particularly described with reference to FIGS. 8 and 9 below.

Yet further with regard to FIG. 3, the "hot" video object may move from one VOP to another VOP as particularly illustrated in FIG. 2. Therefore, the motion decoding 320, motion compensation 322 and shape decoding 332 enable the entertainment system 100 to always know a horizontal and vertical display location of the "hot" video object on the video display device 124. It is noted that all video objects using the same user-defined descriptive information of user_data 340 belong to the same "hot" video object, so for simplicity, the same user_data 340 is accessed by the microprocessor 102 for the "hot" video object. In operation the display of a "hot" video object commences with the decoder 130 reading a parameter video_object_start_code in the MPEG-4 video data, and is followed by one or more video object layers that comprise the overall video object. The parameter video_object_start_code has a hexadecimal value (i.e., base-16) of 00 through 1F for recommencing the display of video data from a particular source as described above. It is noted that a video object has many parameters that define it. These parameters include a user_data_start_code, which is a hexadecimal bit string "000001B2" that identifies the beginning of user-specified data, i.e., user_data 340, that identifies user-defined descriptive information associated with a "hot" video object. The user_data 340 data continues until receipt of another user_data_start_code, such as video_object_layer_start_code, which denotes start of one or more video object layers. The user_data 340 is a series of 8-bit integers, which is defined by a user for a specific application. According to the present invention, the user_data 340 associated with a "hot" video object includes user-defined descriptive information, which is displayed on video display device 124 upon user selection via input device 112.

Figure 4:
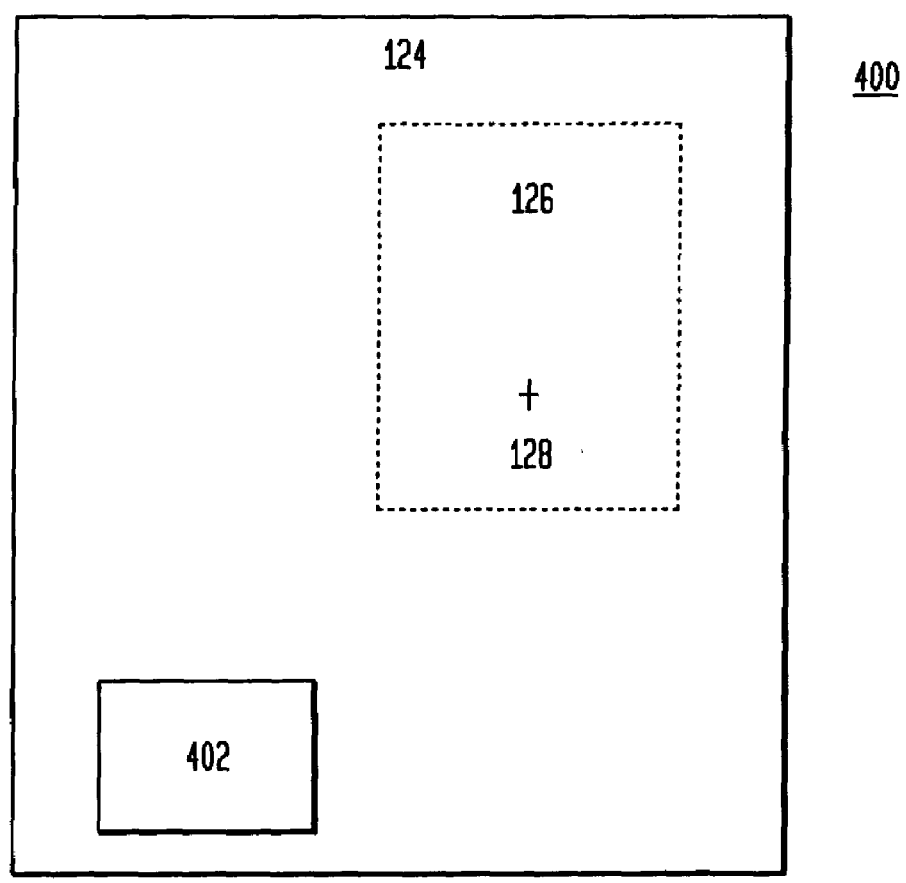
FIG. 4 is an exemplary illustration depicting the display of user-defined descriptive information associated with a "hot" object on a video display device according to the present invention.

FIG. 4 is an exemplary illustration 400 depicting the display of user-defined descriptive information associated with a "hot" object on a video display device according to the present invention. As will be described below in FIG. 5 or 6, there are alternate methods for triggering or invoking the display of the descriptive information associated with the "hot" object according to the present invention. Notwithstanding the alternate methods, in operation, when a user places a cursor 128 over a "hot" video object 126 (whether for a predetermined period of time of FIG. 5, depresses mouse button of FIG. 6), the user-defined descriptive information of user_data 340 for the "hot" video object 126 is temporarily displayed as a textual image 402 on video display device 124. The textual image 402 is preferably descriptive text, such as "Anderson's Windows."

FIG. 5 is an exemplary method flowchart 500 depicting a preferred method for displaying the user-defined descriptive information associated with a "hot" video object on video display device 124 according to the present invention. The method flowchart begins at step 502. At step 504, the decoder 130 queries whether a new VOP is created from the video data read from disk player 148 or any other video source 136, 140 and 144. If there is no new VOP created, the method flowchart 500 continues again at step 504. Otherwise, if a new VOP is created at step 504, the location for the "hot" video object is updated at step 506, i.e., the location comprising the horizontal and vertical location of the "hot" video object 126 on the video display device 124. At step 508, the current position of cursor 128 is read by microprocessor 102 from the input device 112. The method flowchart 500 continues at step 510, where the microprocessor 102 queries whether the cursor 128 is over a "hot" video object. If the cursor 128 is not over a "hot" video object, the method flowchart 500 continues at step 504. Otherwise, if the cursor 128 is over a "hot" video object, the method flowchart 500 continues at step 512, where a timer that measures elapsed time for displaying user-defined descriptive information is initialized to zero. Thereafter, the method flowchart 500 continues at step 514, where the descriptive information of user_data 340 is displayed on the video display device 124, as particularly described with reference to FIG. 4 above. The method flowchart 500 continues at step 516, where the microprocessor 102 performs a check regarding whether the timer is greater than a predetermined period of time Tstop, i.e., a period time which may be user-defined or be a default period of time (e.g., 5 seconds). Therefore, if the timer in not greater than Tstop, the method flowchart 500 continues at step 514, thereby displaying the descriptive information on the video display device 124. However, once the timer is greater than Tstop, the display of descriptive information ceases and the method continues at step 504 where the decoder 130 queries whether a new VOP is created from the video data read from disk player 148 or any other video source 136, 140 and 144.

FIG. 6 is an exemplary method flowchart 600 depicting an alternate method for displaying the user-defined descriptive information associated with a "hot" video object on video display device 124 according to the present invention. The method flowchart begins at step 602. At step 604, the decoder 130 queries whether a new VOP is created from the video data read from disk player 148 or any other video source 136, 140 and 144. If there is no new VOP created, the method flowchart 600 continues again at step 604. Otherwise, if a new VOP is created at step 604, the location for the "hot" video object is updated at step 606, i.e., the location comprising the horizontal and vertical location of the "hot" video object 126 on the video display device 124. At step 608, the microprocessor 102 reads the current position of cursor 128 from input device 112. The method flowchart 600 continues at step 610, where the microprocessor queries whether the cursor 128 is over a "hot" video object. If the cursor 128 is not over a "hot" video object, the method flowchart 600 continues at step 604. Otherwise, if the cursor 128 is over a "hot" video object, the method flowchart 600 continues at step 612, where the microprocessor 102 queries whether a mouse button is depressed of input device 112. If the mouse button is not depressed at step 612, the method flowchart 600 continues at step 604. Otherwise, if the mouse button is depressed at step 612, the method continues at step 614, where user-defined descriptive information of user_data 340 is displayed on video display device 124 as illustrated in FIG. 4 above. Thereafter, the method flowchart 600 continues at step 612, where the microprocessor queries if the mouse button is still depressed. Therefore, according to FIG. 6 the descriptive information is displayed on the video display device 124 as long as the mouse button is depressed at step 612, whereas according to FIG. 5 there is a predetermined timeout period that erases the descriptive information being displayed on the video display device 124.

FIG. 7 depicts an exemplary method flowchart 700 that accounts for the non-displaying of the user-defined descriptive information associated with a "hot" video object on a video display device 124 when the "hot" video object is no longer a part of the VOPs according to the present invention. Once a "hot" video object ceases to be part of the VOPs that are displayed on video display device 124, the descriptive text associate with the "hot" video object is zeroed out and is not displayed as described below. The method flowchart begins at step 702. At step 704, a query is made regarding whether a new VOP is created from the video data read from disk or any other video source. If there is no new VOP created, the method continues again at step 704. However, if a new VOP is created at step 704, at step 706 it is determined whether the "hot" video object is still part of the VOP, i.e., which determines whether descriptive text associated with the object is to be displayed on the display device 124. If at step 706 it is determined that the "hot" video object is no longer in the VOP the method continues at step 714 described below; otherwise the method continues at step 708. At step 708, the location associated with the "hot" video object is updated by the decoder 130. At step 710, the current position of cursor 128 is read by microprocessor 102 from the input device 112. The method continues at step 712, where a query is made regarding whether the cursor 128 is over a "hot" video object. If the cursor 128 is not over a "hot" video object, the method continues at step 714 where a text buffer receives a do not display symbol, such as '~'; otherwise the method continues at step 716, where the contents of user_data 340 for the "hot" video object are written to the text buffer, which is preferably a part of the RAM 108 of FIG. 1. From steps 714 and 716, the method continues at step 718, where the contents of the text buffer are displayed to the video display device 124. It is noted that if the text buffer includes a do not display symbol, no user-defined descriptive information is displayed on the video display device 124, since the "hot" video object is not longer on the VOP.

FIG. 8 represents MPEG-4 video object type indications 800 for non-hot or cold video objects in MPEG-4 video data according to the ISO/IEC 14496 standard described above According to FIG. 8, object type indications 800 comprise video_object types 802 and associated codes 804. There are $2^8$ or 256 possible video_object types 802 and only nine of them are declared 808–824 according to the ISO/IEC 14496 standard depicted in FIG. 8. The declared video object types 802 are video object types 808–824. Video object type 806 is reserved for MPEG-4 utilization, while video object types 826 are reserved for declaring one or more of the additional 256 minus the declared 9 types of video object types 802 available. The implementation of MPEG-4 video object type indications 800 according to the present invention is described in more detail hereinbelow with reference to FIG. 9.

FIG. 9 represents MPEG-4 video object type indications 900 for "hot" video objects in MPEG-4 video data in accordance with ISO/IEC 14496, according to the present invention. More particularly, according to the present invention a "hot" video object is indicated by utilizing certain codes in the reserved field 826 of FIG. 8 above, i.e., codes 00001010–11111111. According to the present invention, a higher-order binary digit, such as the most significant bit in the reserved field 826, is used as an indicator for a "hot" video object. As aforementioned in FIG. 8, since the reserved eight binary digits are used to indicate the video object type 802, there are $2^8$ or 256 possible video object types. Therefore, by using the most significant bit (i.e., the left most or significant bit) in the eight-bit video object type 802 to represent a cold video object (i.e., most significant bit=0) and not using the reserved 00000000 video object type 806, there are $2^7-1$ or 127 possible video object types which are not hot, and only nine which are currently declared in MPEG-4. Likewise, not using the 10000000 video object type 902 for the "hot" video objects to match the 00000000 video object type 806 for the cold video objects, there are a total of 127 corresponding "hot" video object types, starting with video object type 904 (i.e., 10000001) to video object type 922 (i.e., 11111111). Therefore, a total of 127 "hot" video object types may be utilized to display "hot" video objects on the video display device 124 according to the present invention. It is noted that the video object type indications of FIG. 9 are backwards compatible or fully coextensive with video object type indications of FIG. 8 according to MPEG-4, ISO/IEC 14496 standard. It is further noted that the "hot" video objects in FIG. 9 may be seen by a viewer on the video display device 124. Or alternatively, the "hot" video objects may equally be behind what is being seen by the viewer of the video display device 124. For example, a weatherman describing a forecast stands in front of a blue screen and the weather map is merged as a separate video object from behind. Thus, the weatherman actually blocks part of the weather map from view, but the information on that portion of the blocked weather map is still held in memory and as when the weatherman moves, the previously hidden information reappears into view.

Further with reference to FIG. 9, as an alternative indicating a "hot" video object according to FIG. 9, a "hot" video object may be indicated by utilizing a new indicator such as video_object_ad indicator (not shown) instead of video_object_type indicator 802. The new video object ad indicator does not use information explicitly the MPEG-4 specification, but it does conform to the general format for conveying information, i.e., utilizing a hexadecimal value. For example, The value of video_object_ad indicator that indicates a "hot" video object may be video_object_ad="ad" in hexadecimal, which is 173 in base decimal (i.e., base-10), 255 in octal (i.e., base-8), and 10101101 in binary (i.e., base-2). Thus, the hexadecimal value "ad" for the video_object_ad indicator is nicely represented by a single 8-bit byte. Although the video object_ad is new to the MPEG-4 specification, it is defined consistently with similar indicators and parameters that are already utilized by MPEG-4 specification, as particularly illustrated in FIGS. 8 and 9. Therefore, the implementation of video_object_ad indicator or other similarly named indicator represents a very small addition to MPEG-4 specification and is an applicable alternative to using the most significant bit of the video-object type 802 to represent a "hot" video object.

Yet further with reference to FIG. 9, an alternate method to utilizing user data for declaring the user-defined descriptive information associated with a "hot" object may be to use an indicator video_ad_data in video type indications in FIG. 9. Like the user_data 340, video_ad_data may be a series of 8-bit integers. Although video_ad_data is new to the MPEG-4 specification, it is defined consistently with similar indicators and parameters already in MPEG-4 specification as particularly illustrated in FIGS. 8 and 9. Therefore, the implementation of the video ad_data indicator or other similarly named indicator represents a very small addition to MPEG-4 specification.

While the invention has been particularly shown and described with regard to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for displaying textual information associated with a video object embedded in moving images in a received video stream, the method comprising:
    determining whether the video object is a type of video object for which textual information is provided for display therewith, by determining whether a video object type code in the received video stream which is associated with the video object, is of a specified type;
    retrieving the textual information embedded in the received video stream in response to the determining that the video object type code is of the specified type;
    displaying the video object on a display, wherein a location of the video object on the display is selectable by a user by controlling a position of a cursor associated with a pointing device;
    determining whether the user has selected the video object using the pointing device;
    displaying the retrieved textual information embedded in the received video stream on the display, together with the video object, when it is determined that the user has selected the video object.

2. The method of claim 1, wherein:
    the video object exists at a plurality of video object planes in the video stream at a plurality of successive time positions in a time continuum;
    the method further comprising sampling the video object from the received video stream at the plurality of video object planes to determine respective updated locations of the video object in the video object planes.

3. The method of claim 1, further comprising:
    executing a timer to determine a predetermined period of time for displaying the retrieved textual information.

4. The method of claim 1, further comprising:
    determining whether a button on the pointing device is depressed;
    wherein the retrieved textual information is displayed when the button on the pointing device is depressed and the cursor is over the location of the video object.

5. The method of claim 2, wherein the video stream is provided according to an MPEG-4 standard.

6. The method of claim 1, wherein the video object planes (VOPs) comprise at least one of intra coded VOPs, predictive coded VOPs, and bidirectionally-predictive coded VOPs.

7. The method for displaying textual information according to claim 1, wherein the sampling the video object comprises using motion vectors from the received video stream to determine the respective updated locations of the video object in the video object planes.

8. A system for displaying textual information associated with a video object embedded in moving images in a received video stream, the system comprising:
    a display for displaying the video object, wherein a location of the video object on the display is selectable by a user by controlling a position of a cursor associated with a pointing device; and
    a processor for:
        (a) determining whether the user has selected the video object using the pointing device;
        (b) determining whether the video object is a type of video object for which textual information is provided for display therewith, by determining whether a video object type code in the received video stream which is associated with the selected video object, is of a specified type;
        (c) retrieving the textual information embedded in the received video stream in response to the determining that the video object type code is of the specified type;
        (d) determining whether the user has selected the video object using the pointing device; and
        (e) directing a displaying of the retrieved textual information embedded in the received video stream on the display, together with the video object, when it is determined that the user has selected the video object.

9. The system of claim 8, wherein:
    the video object exists at a plurality of video object planes in the video stream at a plurality of successive time positions in a time continuum, and the decoder samples the video object from the received video stream at the plurality of video object planes to determine respective updated locations of the video object in the video object planes.

10. The system of claim 8, further comprising:
    means for executing a timer to determine a predetermined period of time for displaying the retrieved textual information.

11. The system of claim 8, further comprising:
    means for determining whether a button on the pointing device is depressed;
    wherein the retrieved textual information is displayed by the display when the button on the pointing device is depressed and the cursor is over the location of the video object.

12. The system of claim 9, wherein the video stream is provided according to an MPEG-4 standard.

13. The system of claim 9, wherein the video object planes (VOPs) comprise at least one of intra coded VOPs, predictive coded VOPs, and bidirectionally-predictive coded VOPs.

14. The system for displaying textual information according to claim 9, wherein the decoder samples the video object comprises using motion vectors from the received video stream to determine the respective updated locations of the video object in the video object planes.

15. A program storage device readable by machine, tangibly embodying a program of instructions executable by the machine to perform a method for displaying textual information associated with a video object embedded in moving images in a received video stream, the method comprising:
 - determining whether the video object is a type of video object for which textual information is provided for display therewith, by determining whether a video object type code in the received video stream which is associated with the video object, is of a specified type;
 - retrieving the textual information embedded in the received video stream in response to the determining that the video object type code is of the specified type;
 - displaying the video object on a display, wherein a location of the video object on the display is selectable by a user by controlling a position of a cursor associated with a pointing device;
 - determining whether the user has selected the video object using the pointing device; and
 - displaying the retrieved textual information embedded in the received video stream on the display, together with the video object, when it is determined that the user has selected the video object.

16. The program storage device of claim 15, wherein:
 - the video object exists at a plurality of video object planes in the video stream at a plurality of successive time positions in a time continuum;
 - the method further comprising sampling the video object from the received video stream at the plurality of video object planes to determine respective updated locations of the video object in the video object planes.

17. The program storage device of claim 15, wherein the method further comprises:
 - executing a timer to determine a predetermined period of time for displaying the retrieved textual information.

18. The program storage device of claim 16, wherein the video object planes (VOPs) comprise at least one of intra coded VOPs, predictive coded VOPs, and bidirectionally-predictive coded VOPs.

19. The program storage device for displaying textual information according to claim 16, wherein the sampling the video object comprises using motion vectors from the received video stream to determine the respective updated locations of the video object in the video object planes.

* * * * *